United States Patent
Lu et al.

(10) Patent No.: US 11,963,038 B2
(45) Date of Patent: Apr. 16, 2024

(54) HEADER COMPRESSION PROCESSING METHOD AND APPARATUS, COMMUNICATIONS EQUIPMENT

(71) Applicant: GUANGDONG OPPO MOBILE TELECOMMUNICATIONS CORP., LTD., Guangdong (CN)

(72) Inventors: Qianxi Lu, Guangdong (CN); Yang Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 211 days.

(21) Appl. No.: 17/386,319

(22) Filed: Jul. 27, 2021

(65) Prior Publication Data

US 2021/0377797 A1    Dec. 2, 2021

Related U.S. Application Data

(63) Continuation of application No. PCT/CN2019/074478, filed on Feb. 1, 2019.

(51) Int. Cl.
*H04W 28/06* (2009.01)
*H04L 51/066* (2022.01)
(Continued)

(52) U.S. Cl.
CPC ............ *H04W 28/06* (2013.01); *H04L 69/04* (2013.01); *H04L 69/22* (2013.01)

(58) Field of Classification Search
None
See application file for complete search history.

(56) References Cited

U.S. PATENT DOCUMENTS 10,979,402 B1 *  4/2021  Hartley ............... H04L 63/0272
11,109,262 B2 *  8/2021  Pan ....................... H04W 76/12
(Continued)

FOREIGN PATENT DOCUMENTS

| CN | 1889575 A | 1/2007 |
|---|---|---|
| CN | 105101108 A | 11/2015 |

(Continued)

OTHER PUBLICATIONS

Examination Report for European Application No. 19912390.2 dated Jul. 4, 2022. 9 pages.
(Continued)

*Primary Examiner* — Duc T Duong
(74) *Attorney, Agent, or Firm* — Perkins Coie LLP

(57) ABSTRACT

Provided in implementations of the present disclosure are a header compression processing method and apparatus, and communications equipment. The method comprises: transferring first configuration signaling between a first network element and a second network element, the first configuration signaling being used to control a header compression function of the first network element or the second network element; transferring second configuration signaling between the first network element and a terminal, the second configuration signaling being used to control a header compression function of the terminal; control of a header compression function comprising one of the following: starting the header compression function, header compression function configuration, and stopping the header compression function.

4 Claims, 12 Drawing Sheets

(51) Int. Cl.
  *H04L 69/04* (2022.01)
  *H04L 69/22* (2022.01)

(56) References Cited

U.S. PATENT DOCUMENTS

| | | | |
|---|---|---|---|
| 2014/0233376 A1* | 8/2014 | Yu | H04W 28/06 370/230 |
| 2014/0369365 A1* | 12/2014 | Denio | H04L 69/16 370/474 |
| 2016/0359739 A1 | 12/2016 | Cox et al. | |
| 2018/0027096 A1* | 1/2018 | Michael | H04N 21/85406 370/474 |
| 2018/0124639 A1 | 5/2018 | Bathwal et al. | |
| 2020/0022022 A1* | 1/2020 | Ly | H04L 69/04 |
| 2021/0058840 A1* | 2/2021 | Kawasaki | H04W 76/12 |
| 2021/0195463 A1* | 6/2021 | Zhang | H04W 28/06 |
| 2021/0219173 A1* | 7/2021 | Xu | H04W 72/23 |
| 2021/0314815 A1* | 10/2021 | Gangakhedkar | H04L 69/04 |
| 2021/0344441 A1* | 11/2021 | Zhang | H04L 12/46 |
| 2022/0038560 A1* | 2/2022 | Kim | H04L 69/04 |

FOREIGN PATENT DOCUMENTS

| | | |
|---|---|---|
| CN | 106332178 A | 1/2017 |
| WO | WO-2020092780 A1 * | 5/2020 |

OTHER PUBLICATIONS

Extended European Search Report for European Application No. 19912390.2 dated Nov. 12, 2021. 12 pages.

Nokia et al. "Ethernet Header Compression for TSN" R2-1817269; 3GPP TSG-RAN WG2 Meeting #104; Spokane, USA, Nov. 12-16, 2018. 4 pages.

Qualcomm Inc. "RoHC based Header Compression for TSN" R2-1817913; 3GPP TSG-RAN WG2 Meeting #104; Spokane, Washington, Nov. 2018. 6 pages.

Examination Report for European Application No. 19912390.2 dated Dec. 2, 2022. 11 pages.

OPPO "Ethernet Header Compression" R2-1817249; 3GPP TSG RAN WG2 #104; Spokane, USA; Nov. 12-16, 2018. 4 pages.

First Office Action for Chinese Application No. 202110823701.5 dated Nov. 15, 2022. 18 pages with English translation.

Second Office Action for Chinese Application No. 202110823701.5 dated Jan. 19, 2023. 13 pages with English translation.

3GPP TSG-RAN WG2 Meeting #104—R2-1816938—Spokane, USA, Nov. 12-16, 2018—vivo, Ethernet MAC header compression (3 pages).

3GPP TSG-RAN#80—RP-181479—La Jolla, US, Jun. 11-14, 2018—Nokia, Nokia Shanghai Bell, New SID on NR Industrial IoT (5 pages).

International Search Report dated Oct. 22, 2019 of PCT /CN2019/074478 (4 pages).

* cited by examiner

FIG. 5C

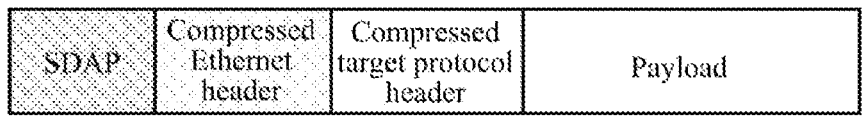

FIG. 5D

| A first configuration signaling is transmitted between a base station and a first network element, the first configuration signaling being used for performing control of a header compression function on the base station, and the control of the header compression function including one of the following: enable of the header compression function, configuration of the header compression function, and disable of the header compression function | 601 |

| A second configuration signaling is transmitted between the base station and a terminal, the second configuration signaling being used for performing control of a header compression function on the terminal, and the control of the header compression function including one of the following: enable of the header compression function, configuration of the header compression function, and disable of the header compression function | 602 |

FIG. 6

HEADER COMPRESSION PROCESSING METHOD AND APPARATUS, COMMUNICATIONS EQUIPMENT

CROSS-REFERENCE TO RELATED APPLICATION

This application is a continuation application of International PCT Application No. PCT/CN2019/074478 filed on Feb. 1, 2019, the entire content of which is hereby incorporated by reference.

TECHNICAL FIELD

Implementations of the present disclosure relate to the technical field of mobile communication, specifically to a method and apparatus of header compression processing, and a communication device.

BACKGROUND

The Long Term Evolution (LTE)/New Radio (NR) protocol defines header compression and decompression functions, which are for IP packets. However, the Internet Engineering Task Force (IETF) has not defined relevant compression algorithms for an Ethernet header and data header of an Ethernet Packet Data Unit (PDU).

SUMMARY

Implementations of the present disclosure provide a method and apparatus of header compression processing, and a communication device.

A method of header compression processing provided by an implementation of the present disclosure includes: transmitting a first configuration signaling between a first network element and a second network element, wherein the first configuration signaling is used for performing control of a header compression function on the first network element or the second network element; and transmitting a second configuration signaling between the first network element and a terminal, wherein the second configuration signaling is used for performing the control of the header compression function on the terminal; wherein the control of the header compression function includes one of the following: enable of the header compression function, configuration of the header compression function, and disable of the header compression function.

A method of header compression processing provided by an implementation of the present disclosure includes: sending, by a first device, an Ethernet frame on which Ethernet header compression is not performed to a second device, wherein the Ethernet frame on which the Ethernet header compression is not performed includes full Ethernet header information; and sending, by the first device, an Ethernet frame on which the Ethernet header compression is performed to the second device, wherein the Ethernet frame on which the Ethernet header compression is performed includes compressed Ethernet header information.

An apparatus of header compression processing provided by an implementation of the present disclosure includes: a first transmission unit, configured to a first configuration signaling between a first network element and a second network element, wherein the first configuration signaling is used for performing control of a header compression function on the first network element or the second network element; and a second transmission unit, configured to transmit a second configuration signaling between the first network element and a terminal, wherein the second configuration signaling is used for performing the control of the header compression function on the terminal; wherein the control of the header compression function includes one of the following: enable of the header compression function, configuration of the header compression function, and disable of the header compression function.

An apparatus of header compression processing provided by an implementation of the present disclosure includes: a first sending unit, configured to send an Ethernet frame on which Ethernet header compression is not performed to a second device, wherein the Ethernet frame on which the Ethernet header compression is not performed includes full Ethernet header information; a second sending unit, configured to send an Ethernet frame on which the Ethernet header compression is performed to the second device, wherein the Ethernet frame on which the Ethernet header compression is performed includes compressed Ethernet header information.

An implementation of the present disclosure provides a communication device, which includes a processor and a memory. The memory is configured to store a computer program, and the processor is configured to call and run the computer program stored in the memory to perform the method of header compression processing described above.

A chip provided by an implementation of the present disclosure is configured to perform the method of header compression processing described above.

Specifically, the chip includes a processor configured to call and run a computer program from a memory to enable a device disposed with the chip to the method of header compression processing described above.

An implementation of the present disclosure provides a computer readable storage medium. The computer readable storage medium is configured to store a computer program which enables a computer to perform the method of header compression processing described above.

An implementation of the present disclosure provides a computer program product. The computer program product includes computer program instructions which enable a computer to perform the method of header compression processing described above.

An implementation of the present disclosure provides a computer program. When the computer program is run on a computer, the computer is enabled to perform the method of header compression processing described above.

BRIEF DESCRIPTION OF DRAWINGS

Drawings described herein are used to provide a further understanding of the present disclosure and form a part of the present disclosure. Illustrative examples of the present disclosure and the description thereof are used to explain the present disclosure and do not constitute improper limitation of the present disclosure. In the drawings:

FIG. 5C shows a third structure of an Ethernet frame on which header compression is performed provided by an implementation of the present disclosure.

FIG. 5D shows a fourth structure of an Ethernet frame on which header compression is performed provided by an implementation of the present disclosure.

FIG. 6 is a second schematic flowchart of a method of header compression processing provided by an implementation of the present disclosure.

DETAILED DESCRIPTION

Technical solutions in implementations of the present disclosure will be described below with reference to the drawings in implementations of the present disclosure. It is apparent that the implementations described are just a part of implementations of the present disclosure, but not all implementations of the present disclosure. Base on the implementations of the present disclosure, all other implementations obtained by a person of ordinary skill in the art without paying an inventive effort belong to the protection scope of the present disclosure.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, or a 5G system, etc.

Figure 1:
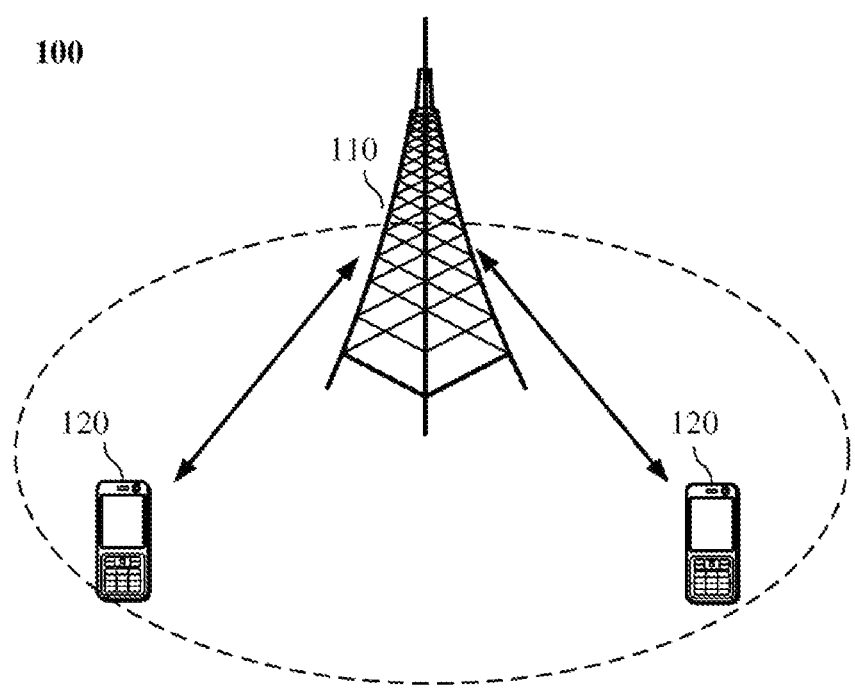
FIG. 1 is a schematic diagram of an architecture of a communication system provided by an implementation of the present disclosure.

Illustratively, a communication system 100 applied in an implementation of the present disclosure is shown in FIG. 1. The communication system 100 may include a network device 110, and the network device 110 may be a device that communicates with a terminal 120 (or referred to as a communication terminal, or a terminal). The network device 110 may provide communication coverage for a specific geographical area, and may communicate with terminals located within the coverage area. Optionally, the network device 110 may be a Base Transceiver Station (BTS) in a GSM system or a CDMA system, a NodeB (NB) in a WCDMA system, an Evolutional Node B (eNB or eNodeB) in an LTE system, or a radio controller in a Cloud Radio Access Network (CRAN), or the network device may be a mobile switch center, a relay station, an access point, a vehicle-mounted device, a wearable device, a hub, a switch, a bridge, a router, or a network side device in a 5G network, or a network device in a future evolved Public Land Mobile Network (PLMN), etc.

The communication system 100 also includes at least one terminal 120 located within a coverage range of the network device 110. As used herein, the "terminal" includes, but not limited to, an apparatus configured to receive/send a communication signal, via a wired circuit connection, for example, via Public Switched Telephone Networks (PSTN), a Digital Subscriber Line (DSL), a digital cable, a direct cable connection; and/or another data connection/network; and/or via a wireless interface, for instance, for a cellular network, a Wireless Local Area Network (WLAN), a digital television network such as a DVB-H network, a satellite network, or an AM-FM broadcast sender; and/or another terminal; and/or an Internet of Things (IoT) device. A terminal configured to communicate via a wireless interface may be referred to as a "wireless communication terminal", a "wireless terminal" or a "mobile terminal". Examples of the mobile terminal include, but not limited to, a satellite or cellular telephone, a Personal Communication System (PCS) terminal which may combine with a cellular radio telephone and data processing, faxing, and data communication abilities, a PDA that may include a radio telephone, a pager, an Internet/intranet access, a Web browser, a memo pad, a calendar, and/or a Global Positioning System (GPS) receiver, and a conventional laptop and/or palmtop receiver or another electronic apparatus including a radio telephone transceiver. The terminal may be referred to an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a wireless modem, a vehicle-mounted device, a wearable device, a terminal in a 5G network, a terminal in a future evolved Public Land Mobile Network (PLMN), or the like.

Optionally, Device to Device (D2D) communication may be performed between the terminals 120.

Optionally, the 5G system or the 5G network may also be referred to as a New Radio (NR) system or an NR network.

FIG. 1 exemplifies one network device and two terminals. Optionally, the communication system 100 may include multiple network devices, and other quantity of terminals may be included within a coverage range of each network device, which is not limited by the implementations of the present disclosure.

Optionally, the communication system 100 may also include another network entity such as a network controller, a mobile management entity, or the like, which is not limited in the implementations of the present disclosure.

It should be understood that, a device with a communication function in a network/system in the implementations of the present disclosure may be referred to as a communication device. Taking the communication system 100 shown in FIG. 1 as an example, the communication device may include a network device 110 and a terminal 120 which have communication functions, and the network device 110 and the terminal 120 may be specific devices described above, which will not be repeated here. The communication device may also include other device in the communication system 100, e.g., other network entities such as a network controller, a mobile management entity, etc., which is not limited by the implementations of the present disclosure.

It should be understood that the terms "system" and "network" herein are often used interchangeably in this document. The term "and/or" in this document is merely an association relationship describing associated objects, indicating that there may be three relationships, for example, A and/or B may indicate three cases: A alone, both of A and B, and B alone. In addition, the symbol "/" in this document generally indicates that objects before and after the symbol "/" have an "or" relationship.

In order to facilitate understanding of the technical solutions of the implementations of the present disclosure, the related technologies of the implementations of the present disclosure are described below, and any combination of the following related technologies and the technical solutions of the implementations of the present disclosure falls within the protection scope of the implementations of the present disclosure.

1) Ethernet PDU

Figure 2:
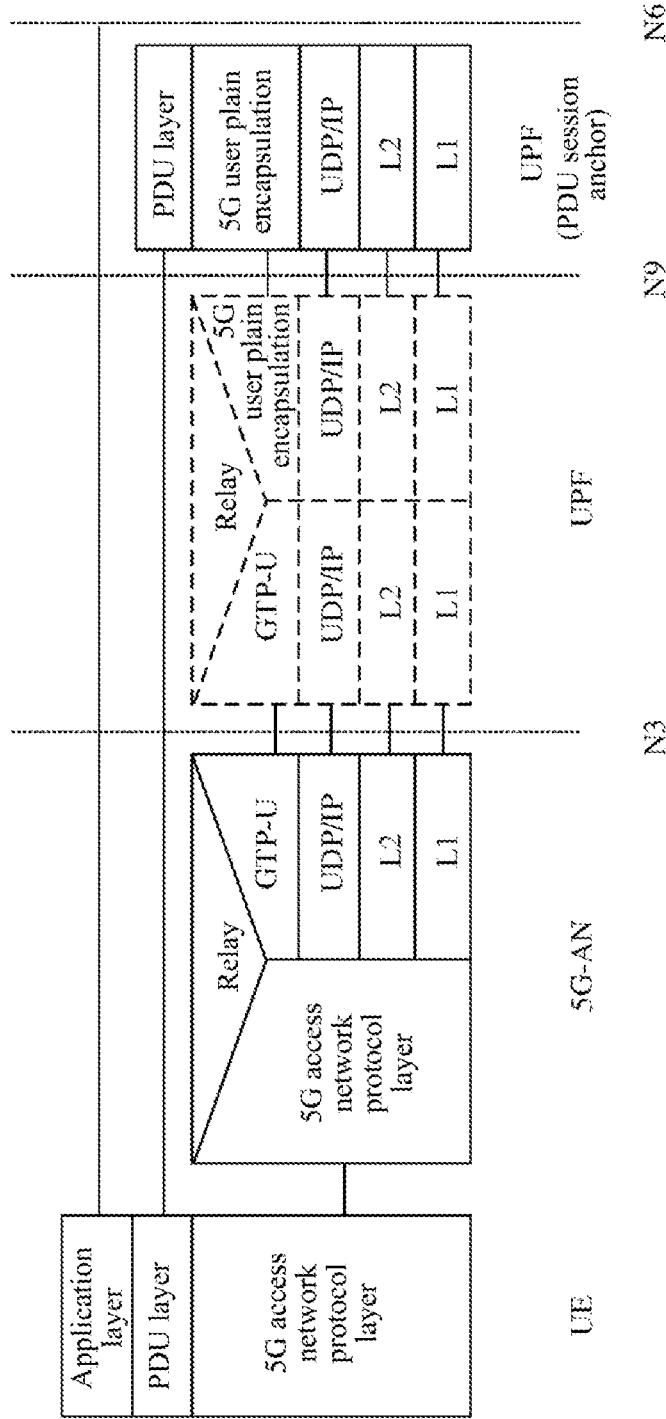
FIG. 2 is a diagram of an architecture of a 5G network provided by an implementation of the present disclosure.

In an LTE system, a type of a PDU session is an IP type. In a 5G NR system, not only the IP type is supported, but also an Ethernet type is introduced. As shown in FIG. 2, for a PDU layer, when the type of the PDU session is the IP type, such as IPv4 type, IPv6 type or IPv4v6 type, a data unit corresponding to the PDU session is an IP data packet, such as an IPv4 packet and/or IPv6 packet; when the type of the PDU session is the Ethernet type, a data unit corresponding to the PDU session is an Ethernet frame, that is, an Ethernet PDU.

2) ROHC Function

The LTE/NR protocol defines a header compression and decompression function for supporting different Data Radio Bearers (DRBs) and using different header compression and decompression parameters according to configured profiles. The header compression and decompression parameters are for IP packets, which is specified to use the ROHC protocol on a Packet Data Convergence Protocol (PDCP) layer to implement. At present, profiles supporting the ROHHC function of IP packets are shown in table 1 below:

TABLE 1

| Profile ID | Function | Reference |
|---|---|---|
| 0x0000 | No compression | RFC 5795 |
| 0x0001 | RTP/UDP/IP | RFC 3095, RFC 4815 |
| 0x0002 | UDP/IP | RFC 3095, RFC 4815 |
| 0x0003 | ESP/IP | RFC 3095, RFC 4815 |
| 0x0004 | IP | RFC 3843, RFC 4815 |
| 0x0006 | TCP/IP | RFC 6846 |
| 0x0101 | RTP/UDP/IP | RFC 5225 |
| 0x0102 | UDP/IP | RFC 5225 |
| 0x0103 | ESP/IP | RFC 5225 |
| 0x0104 | IP | RFC 5225 |

However, the IETF has not defined relevant compression algorithms for an Ethernet header and data header of the Ethernet PDU. Difficulty to define the compression algorithm for the Ethernet PDU lies in that when header compression and decompression processing is performed on a packet header of the Ethernet PDU, the following situations needs to be considered.

1) Applicable, at the same time, to two cases, i.e., configuration and non-configuration of the data header;

2) Applicable, at the same time, to several cases in which the Ethernet header and the data header are compressed respectively and independently;

3) Applicable to header compressions performed in a UPF (on an upper protocol layer of the PDCP layer) and a base station (a PDCP layer).

An implementation of the present disclosure designs a method of header compression processing, which may be applied to the above different situations and simplify related standardization work as much as possible.

Figure 3:
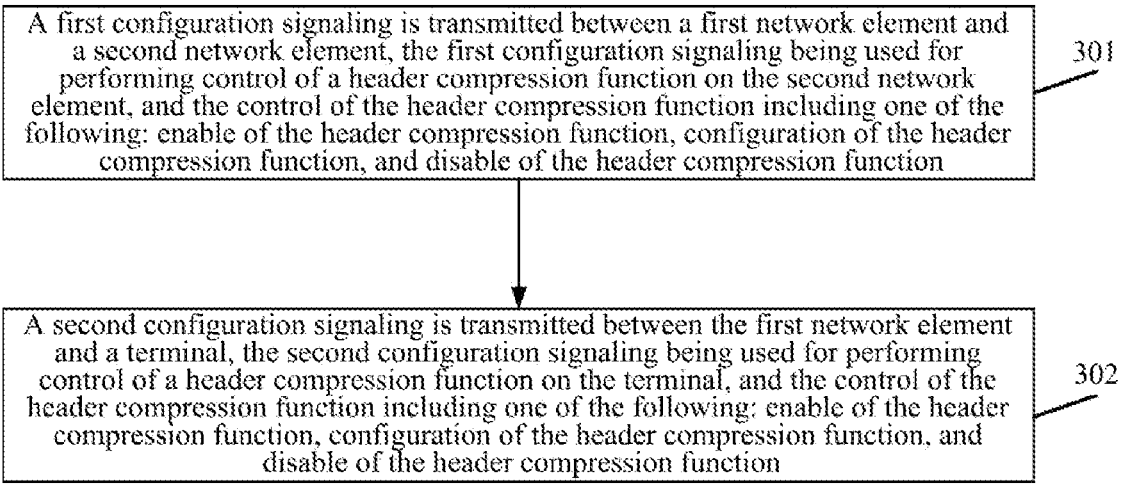
FIG. 3 is a first schematic flowchart of a method of header compression processing provided by an implementation of the present disclosure.

FIG. 3 is a first schematic flowchart of a method of header compression processing provided by an implementation of the present disclosure. As shown in FIG. 3, the method of header compression processing includes acts 301-302.

In act 301, a first configuration signaling is transmitted between a first network element and a second network element, wherein the first configuration signaling is used for performing control of a header compression function on the second network element, and the control of the header compression function includes one of the following: enable of the header compression function, configuration of the header compression function, and disable of the header compression function.

In an implementation of the present disclosure, the first network element is a control plane network element on a core network side, and in a 5G system, the first network element is an Access and Mobility Management Function (AMF) network element and/or a Session Management Function (SMF) network element.

In an implementation of the present disclosure, the second network element is a user plane network element on the core network side, and in the 5G system, the second network element is a User Plain Function (UPF).

In an implementation of the present disclosure, transmission of the first configuration signaling between the first network element and the second network element may be realized in any one of the following ways.

Way one: the first network element sends the first configuration signaling to the second network element, wherein the first configuration signaling is used for performing control of a header compression function on the second network element, and the control of the header compression function includes one of the following: enable of the header compression function, configuration of the header compression function, and disable of the header compression function.

Way two: the first network element receives the first configuration signaling sent by the second network element, wherein the first configuration signaling is used for performing control of a header compression function on the second network element, and the control of the header compression function includes one of the following: enable of the header compression function, configuration of the header compression function, and disable of the header compression function.

In act 302, a second configuration signaling is transmitted between the first network element and a terminal, wherein the second configuration signaling is used for performing control of a header compression function on the terminal, and the control of the header compression function includes one of the following: enable of the header compression function, configuration of the header compression function, and disable of the header compression function.

In an implementation of the present disclosure, transmission of the second configuration signaling between the first network element and the terminal may be realized in any one of the following ways.

Way one: the first network element sends the second configuration signaling to the terminal, wherein the second configuration signaling is used for performing control of a header compression function on the terminal, and the control of the header compression function includes one of the following: enable of the header compression function, configuration of the header compression function, and disable of the header compression function.

Way two: the first network element sends the second configuration signaling to a base station, and the base station sends the second configuration signaling to the terminal, wherein the second configuration signaling is used for performing control of a header compression function on the terminal, and the control of the header compression function includes one of the following: enable of the header compression function, configuration of the header compression function, and disable of the header compression function.

In an implementation of the present disclosure, the configuration of the header compression function is performed by taking a session or a data flow as a granularity. Here the session may be a PDU session, and the data flow may be a Quality of Service flow (QoS flow).

For example, header compression function 1 is configured for PDU session1 and header compression function 2 is configured for PDU session2. If an Ethernet frame, that is, an Ethernet PDU, belongs to PDU session1, then the Ethernet frame uses header compression function 1 to perform header compression.

For another example, header compression function 1 is configured for QoS flow1, and header compression function 2 is configured for QoS flow2. If an Ethernet frame, that is, an Ethernet PDU, belongs to QoS flow2, then the Ethernet frame uses header compression function 2 to perform the header compression.

In an implementation of the present disclosure, a control of a header compression function between a terminal and a UPF can be realized, and the control of the header compression function includes one of the following: enable of the header compression function, configuration of the header compression function, and disable of the header compression function, and the header compression function is realized on a target protocol layer located above the PDCP layer. In an example, as shown in FIG. 2, the target protocol layer is a PDU layer.

In an implementation of the present disclosure, the header compression function is used for header compression of an Ethernet frame (i.e., Ethernet PDU). Here, the Ethernet frame includes the following two cases.

Case 1: the Ethernet frame includes an Ethernet header and a payload.

Figure 4A:
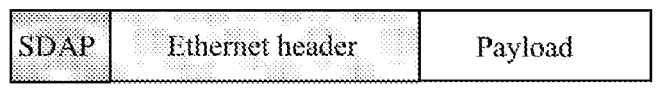
FIG. 4A shows a first structure of an Ethernet frame on which header compression is not performed provided by an implementation of the present disclosure.
Figure 4B:
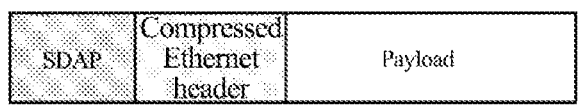
FIG. 4B shows a first structure of an Ethernet frame on which header compression is performed provided by an implementation of the present disclosure.

Referring to FIG. 4A and FIG. 4B, FIG. 4A is a structure of an Ethernet frame on which header compression is not performed, and FIG. 4B is a structure of an Ethernet frame on which header compression is performed, where the header compression refers to compressing the Ethernet header.

Case 2: the Ethernet frame includes an Ethernet header, a target protocol header and a payload.

Here, the target protocol header includes at least one of the following: an IP header, a User Datagram Protocol (UDP) header, and a Real-time Transport Protocol (RTP) header.

Figure 5A:
FIG. 5A shows a second structure of an Ethernet frame on which header compression is not performed provided by an implementation of the present disclosure.
Figure 5B:
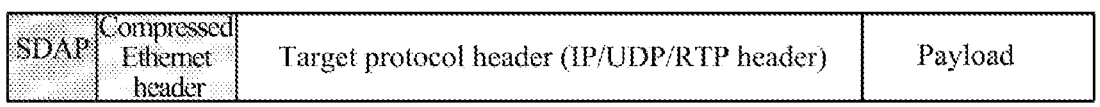
FIG. 5B shows a second structure of an Ethernet frame on which header compression is performed provided by an implementation of the present disclosure.

Referring to FIG. 5A to FIG. 5D, FIG. 5A is a structure of an Ethernet frame on which header compression is not performed, and FIG. 5B to FIG. 5D are structures of Ethernet frames on which header compression is performed, where the header compression refers to compressing the Ethernet header (as shown in FIG. 5B), or compressing the target protocol header (as shown in FIG. 5C), or compressing the Ethernet header and the target protocol header (as shown in FIG. 5D).

In an implementation of the present disclosure, the enable or configuration or disable of the header compression function is performed when a session (such as a PDU session) or a data flow (a QoS flow) is established.

FIG. 6 is a second schematic flowchart of a method of header compression processing according to an implementation of the present disclosure. As shown in FIG. 6, the method of header compression processing includes acts 601-602.

In act 601, a first configuration signaling is transmitted between a base station and a first network element, wherein the first configuration signaling is used for performing control of a header compression function on the base station, and the control of the header compression function includes one of the following: enable of the header compression function, configuration of the header compression function, and disable of the header compression function.

In an implementation of the present disclosure, the first network element is a control plane network element on the core network side, and in the 5G system, the first network element is an AMF and/or SMF.

In an implementation of the present disclosure, in the 5G system, the base station is a gNB.

In an implementation of the present disclosure, transmission of the first configuration signaling between the base station and the first network element may be realized in the following way: the base station receives the first configuration signaling sent by the first network element, wherein the first configuration signaling is used for performing control of a header compression function on the base station, and the control of the header compression function includes one of the following: enable of the header compression function, configuration of the header compression function, and disable of the header compression function.

In act 602, a second configuration signaling is transmitted between the base station and a terminal, wherein the second configuration signaling is used for performing control of a header compression function on the terminal, and the control of the header compression function includes one of the following: enable of the header compression function, configuration of the header compression function, and disable of the header compression function.

In an implementation of the present disclosure, transmission of the second configuration signaling between the base station and the terminal may be realized in the following way: the base station sends the second configuration signaling to the terminal, wherein the second configuration signaling is used for performing control of a header compression function on the terminal, and the control of the header compression function includes one of the following: enable of the header compression function, configuration of the header compression function, and disable of the header compression function.

In an implementation of the present disclosure, the configuration of the header compression function takes a bearer as a granularity.

For example, header compression function 1 is configured for bearer1, and header compression function 2 is configured for bearer2. If an Ethernet frame, that is, an Ethernet PDU, belongs to bearer1, then the Ethernet frame uses header compression function 1 to perform header compression.

In an implementation of the present disclosure, a control of a header compression function between a terminal and a base station (that is an RAN) can be realized, and the control of the header compression function includes one of the following: enable of the header compression function, configuration of the header compression function, and disable of the header compression function, and the header compression function is realized on a PDCP layer, and the PDCP layer is shown in FIG. 2.

In an implementation of the present disclosure, the header compression function is used for header compression of an Ethernet frame (i.e., Ethernet PDU). Here, the Ethernet frame includes the following two cases.

Case 1: the Ethernet frame includes an Ethernet header and a payload.

Referring to FIG. 4A and FIG. 4B, FIG. 4A is a structure of an Ethernet frame on which header compression is not performed, and FIG. 4B is a structure of an Ethernet frame on which header compression is performed, where the header compression refers to compressing the Ethernet header.

Case 2: the Ethernet frame includes an Ethernet header, a target protocol header and a payload.

Here, the target protocol header includes at least one of an IP header, a UDP header, and an RTP header.

Referring to FIG. 5A to FIG. 5D, FIG. 5A is a structure of an Ethernet frame on which header compression is not performed, and FIG. 5B to FIG. 5D are structures of Ethernet frames on which header compression is performed, where the header compression refers to compressing the Ethernet header (as shown in FIG. 5B), or compressing the target protocol header (as shown in FIG. 5C), or compressing the Ethernet header and the target protocol header (as shown in FIG. 5D).

In an implementation of the present disclosure, the enable or configuration or disable of the header compression function is performed when a bearer is established.

Figure 7:
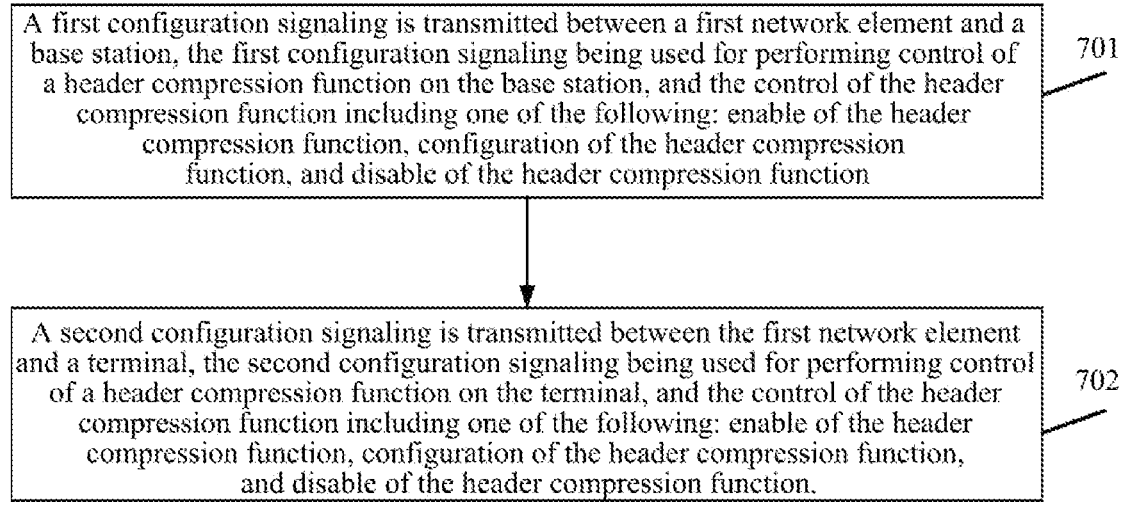
FIG. 7 is a third schematic flowchart of a method of header compression processing provided by an implementation of the present disclosure.

FIG. 7 is a third schematic flowchart of a method of header compression processing according to an implementation of the present disclosure. As shown in FIG. 7, the method of header compression processing includes acts 701-702.

In act 701, a first configuration signaling is transmitted between a first network element and a base station, wherein the first configuration signaling is used for performing control of a header compression function on the base station, and the control of the header compression function includes one of the following: enable of the header compression function, configuration of the header compression function, and disable of the header compression function.

In an implementation of the present disclosure, the first network element is a control plane network element on a core network side, and in the 5G system, the first network element is an AMF and/or SMF.

In an implementation of the present disclosure, in the 5G system, the base station is a gNB.

In an implementation of the present disclosure, transmission of the first configuration signaling between the first network element and the base station may be realized in the following way: the first network element sends the first configuration signaling to the base station, wherein the first configuration signaling is used for performing control of a header compression function on the base station, and the control of the header compression function includes one of the following: enable of the header compression function, configuration of the header compression function, and disable of the header compression function.

In act 702, a second configuration signaling is transmitted between the first network element and a terminal, wherein the second configuration signaling is used for performing control of a header compression function on the terminal, and the control of the header compression function includes one of the following: enable of the header compression function, configuration of the header compression function, and disable of the header compression function.

In an implementation of the present disclosure, transmission of the second configuration signaling between the first network element and the terminal may be realized in the following way: the first network element sends the second configuration signaling to the terminal, wherein the second configuration signaling is used for performing control of a header compression function on the terminal, and the control of the header compression function includes one of the following: enable of the header compression function, configuration of the header compression function, and disable of the header compression function.

In an implementation of the present disclosure, the configuration of the header compression function takes a bearer as a granularity.

For example, header compression function 1 is configured for bearer1, and header compression function 2 is configured for bearer2. If an Ethernet frame, that is, an Ethernet PDU, belongs to bearer1, then the Ethernet frame uses header compression function 1 to perform header compression.

In an implementation of the present disclosure, a control of a header compression function between a terminal and a base station (that is an RAN) can be realized, and the control of the header compression function includes one of the following: enable of the header compression function, configuration of the header compression function, and disable of the header compression function, and the header compression function is realized on a PDCP layer, and the PDCP layer is shown in FIG. 2.

In an implementation of the present disclosure, the header compression function is used for header compression of an Ethernet frame (i.e., Ethernet PDU). Here, the Ethernet frame includes the following two cases.

Case 1: the Ethernet frame includes an Ethernet header and a payload.

Referring to FIG. 4A and FIG. 4B, FIG. 4A is a structure of an Ethernet frame on which header compression is not performed, and FIG. 4B is a structure of an Ethernet frame on which header compression is performed, where the header compression refers to compressing the Ethernet header.

Case 2: the Ethernet frame includes an Ethernet header, a target protocol header and a payload.

Here, the target protocol header includes at least one of an IP header, a UDP header, and an RTP header.

Referring to FIG. 5A to FIG. 5D, FIG. 5A is a structure of an Ethernet frame on which header compression is not performed, and FIG. 5B to FIG. 5D are structures of Ethernet frames on which header compression is performed, where the header compression refers to compressing the Ethernet header (as shown in FIG. 5B), or compressing the target protocol header (as shown in FIG. 5C), or compressing the Ethernet header and the target protocol header (as shown in FIG. 5D).

In an implementation of the present disclosure, the enable or configuration or disable of the header compression function is performed when a bearer is established.

Figure 8:
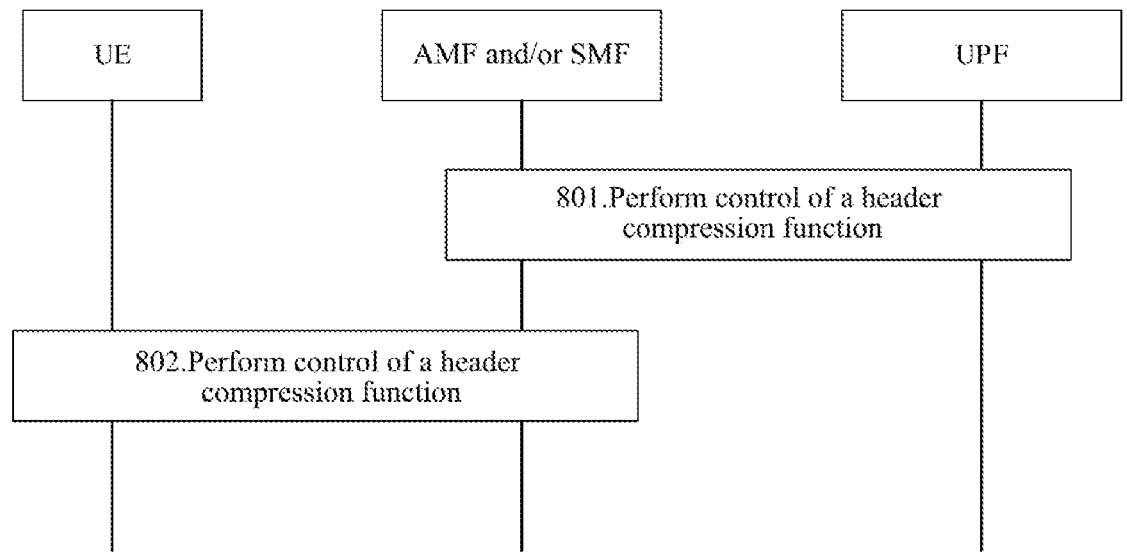
FIG. 8 is a fourth schematic flowchart of a method of header compression processing provided by an implementation of the present disclosure.

FIG. 8 is a fourth schematic flowchart of a method of header compression processing according to an implementation of the present disclosure. As shown in FIG. 8, the method of header compression processing includes acts 801-802.

In act 801, a control of a header compression function is performed between an AMF and/or SMF and a UPF.

Here the control of the header compression function includes one of the following: enable of the header compression function, configuration of the header compression function, and disable of the header compression function.

Here, the AMF and/or SMF may send a first configuration signaling to the UPF to perform control of a header compression function, and the control of the header compression function includes one of the following: enable of the header compression function, configuration of the header compression function, and disable of the header compression function. Or, the UPF sends a first configuration signaling to the AMF and/or SMF to perform control of a header compression function, and the control of the header compression function includes one of the following: enable of the header compression function, configuration of the header compression function, and disable of the header compression function.

In act 802, a control of a header compression function is performed between an AMF and/or SMF and a UE.

Here the control of the header compression function includes one of the following: enable of the header compression function, configuration of the header compression function, and disable of the header compression function.

Here, the AMF and/or SMF may send a second configuration signaling to the UE to perform control of a header compression function, and the control of the header compression function includes one of the following: enable of the header compression function, configuration of the header compression function, and disable of the header compression function. Or, the AMF and/or SMF sends a second configuration signaling to a gNB and then the gNB sends the second configuration signaling to the UE to perform control of a header compression function, and the control of the header compression function includes one of the following: enable of the header compression function, configuration of the header compression function, and disable of the header compression function.

Figure 9:
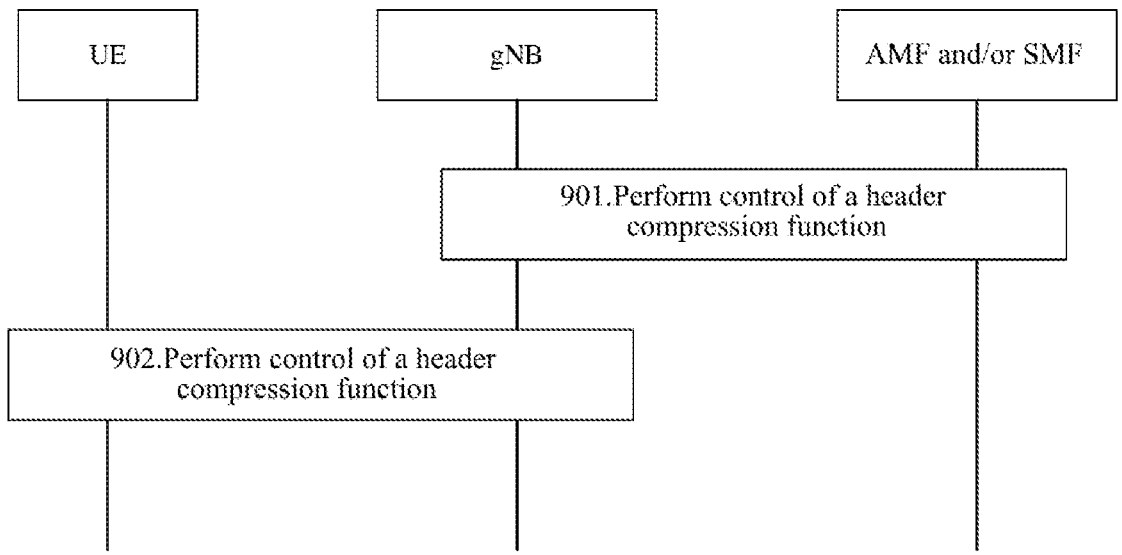
FIG. 9 is a fifth schematic flowchart of a method of header compression processing provided by an implementation of the present disclosure.

FIG. 9 is a fifth schematic flowchart of a method of header compression processing according to an implementation of the present disclosure. As shown in FIG. 9, the method of header compression processing includes acts 901-902.

In act 901, a control of a header compression function is performed between an AMF and/or SMF and a gNB.

Here the control of the header compression function includes one of the following: enable of the header compression function, configuration of the header compression function, and disable of the header compression function.

Here, the AMF and/or SMF may send a first configuration signaling to a gNB to perform control of a header compression function, and the control of the header compression function includes one of the following: enable of the header compression function, configuration of the header compression function, and disable of the header compression function.

In act 902, a control of a header compression function is performed between a gNB and a UE.

Here the control of the header compression function includes one of the following: enable of the header compression function, configuration of the header compression function, and disable of the header compression function.

Here, the gNB may send a second configuration signaling to the UE to perform control of a header compression function, and the control of the header compression function includes one of the following: enable of the header compression function, configuration of the header compression function, and disable of the header compression function.

Figure 10:
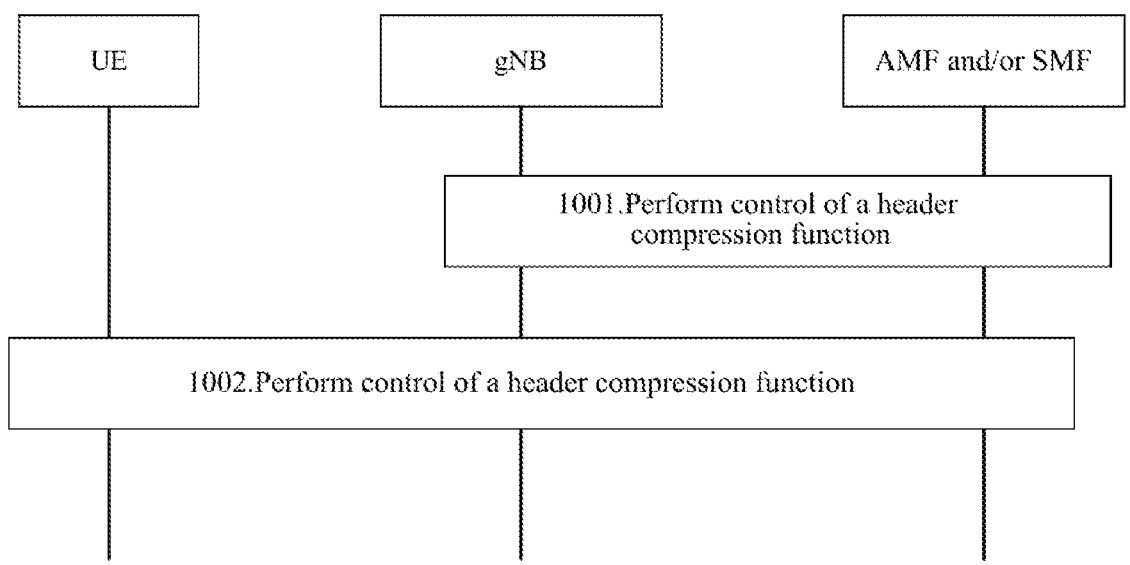
FIG. 10 is a sixth schematic flowchart of a method of header compression processing provided by an implementation of the present disclosure.

FIG. 10 is a sixth schematic flowchart of a method of header compression processing according to an implementation of the present disclosure. As shown in FIG. 10, the method of header compression processing includes acts 1001-1002.

In act 1001, a control of a header compression function is performed between an AMF and/or SMF and a gNB.

Here the control of the header compression function includes one of the following: enable of the header compression function, configuration of the header compression function, and disable of the header compression function.

Here, the AMF and/or SMF may send a first configuration signaling to a gNB to perform control of a header compression function, and the control of the header compression function includes one of the following: enable of the header compression function, configuration of the header compression function, and disable of the header compression function.

In act 1002, a control of a header compression function is performed between an AMF and/or SMF and a UE.

Here the control of the header compression function includes one of the following: enable of the header compression function, configuration of the header compression function, and disable of the header compression function.

Here, the AMF and/or SMF may send a second configuration signaling to the UE to perform control of a header compression function, and the control of the header compression function includes one of the following: enable of the header compression function, configuration of the header compression function, and disable of the header compression function.

It should be noted that the method of header compression processing in the above implementations belongs to a control plane procedure, and after the above control plane procedure is completed, a sending end and a receiving end may perform header compression and decompression processing on Ethernet frames based on the configuration of header compression function.

Figure 11:
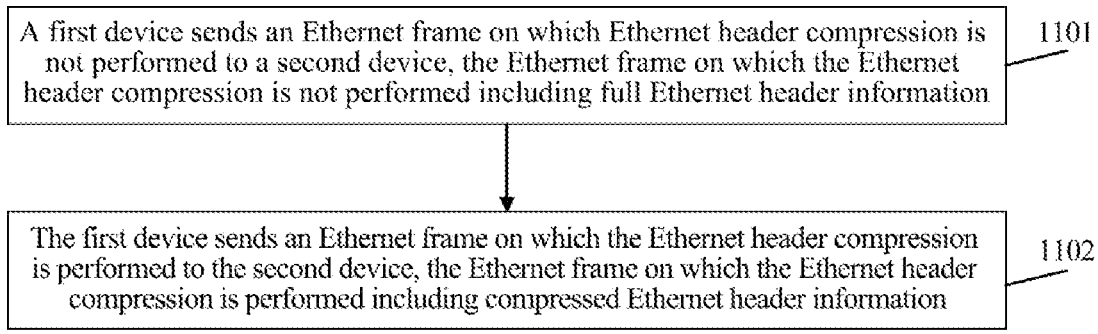
FIG. 11 is a seventh schematic flowchart of a method of header compression processing provided by an implementation of the present disclosure.

FIG. 11 is a seventh schematic flowchart of a method of header compression processing according to an implementation of the present disclosure. As shown in FIG. 11, the method of header compression processing includes acts 1101-1102.

In act 1101, a first device sends an Ethernet frame on which Ethernet header compression is not performed to a second device, wherein the Ethernet frame on which the Ethernet header compression is not performed includes full Ethernet header information.

Here, the first device and the second device are implemented in the following ways.

Way one: the first device is a terminal and the second device is a UPF.

Way two: the first device is a UPF, and the second device is a terminal.

Way three: the first device is a terminal, and the second device is a base station.

Way four: the first device is a base station, and the second device is a terminal.

For the above-mentioned way one and way two, it is needed to complete the configuration and enable of the header compression function between the terminal and the UPF through the control plane procedure of the implementation of the present disclosure.

For the above-mentioned way three and way four, it is needed to complete the configuration and enable of the header compression function between the terminal and the base station through the control plane procedure of the implementation of the present disclosure.

In an implementation of the present disclosure, the full Ethernet header information includes at least one of the following:

first context identifier information (Context ID, CID) for representing a context to which the Ethernet header information is applied;

first indication information for indicating whether the Ethernet header information in the Ethernet frame is full or compressed;

first Cyclic Redundancy Check (CRC) information for the second device to check the received Ethernet header information;

second indication information for the second device to determine a header format of the Ethernet header information, and then determine a decompression mode based on the header format of the Ethernet header information.

In the above solution, the first context identifier information is represented by at least one of a session identifier, a data flow identifier, and a bearer identifier. Herein, the session identifier is, for example, a PDU session ID; the data flow identifier is, for example, QFI (QoS flow ID); and the bearer identifier is, for example, a bearer ID.

In a specific implementation, the first context identifier information is used for representing a context to which the Ethernet header information is applied. Taking the data flow as an example, multiple different data flows may be borne between the first device and the second device, and the header information of each data flow is different, which needs to be distinguished by the first context identifier information (such as QFI).

Here, for the data header of the Ethernet frame, that is, the target protocol header, context identifier information (called second context identifier information) is also needed to represent a context to which target protocol header information is applied. To distinguish the first context identifier information from the second context identifier information, the first context identifier information and the second context identifier information belong to different identifier ranges.

For example, the first context identifier information may be selected from a range of ID numbers 1-20, and the second context identifier information may be selected from a range of ID numbers 30-50, thereby capable of avoiding a situation in which the first context identifier information of the Ethernet header information cannot be distinguished from the second context identifier information of the target protocol header information.

In the above solution, the first indication information may be represented through packet format type info, and the first indication information is used for indicating whether the Ethernet header information in the Ethernet frame is full or compressed. Here, the first indication information indicates the Ethernet header information in the Ethernet frame is full.

In the above solution, the second indication information is used for the second device to determine a header format of the Ethernet header information, and then determine a decompression mode based on the header format of the Ethernet header information. In an example, the second indication information may be a profile identifier. Further, the second indication information is used for the second device to determine at least one of the following of the Ethernet header information:

a frame format;

whether an Ethernet type field is used for identifying a length or a type;

whether an 802.1q field exists;

Whether an 802.1q field exists, and if the 802.1q field exists, whether there is one 802.1q field or two 802.1q fields;

whether an LLC field exists;

whether an SNAP field exists.

Figure 12A:
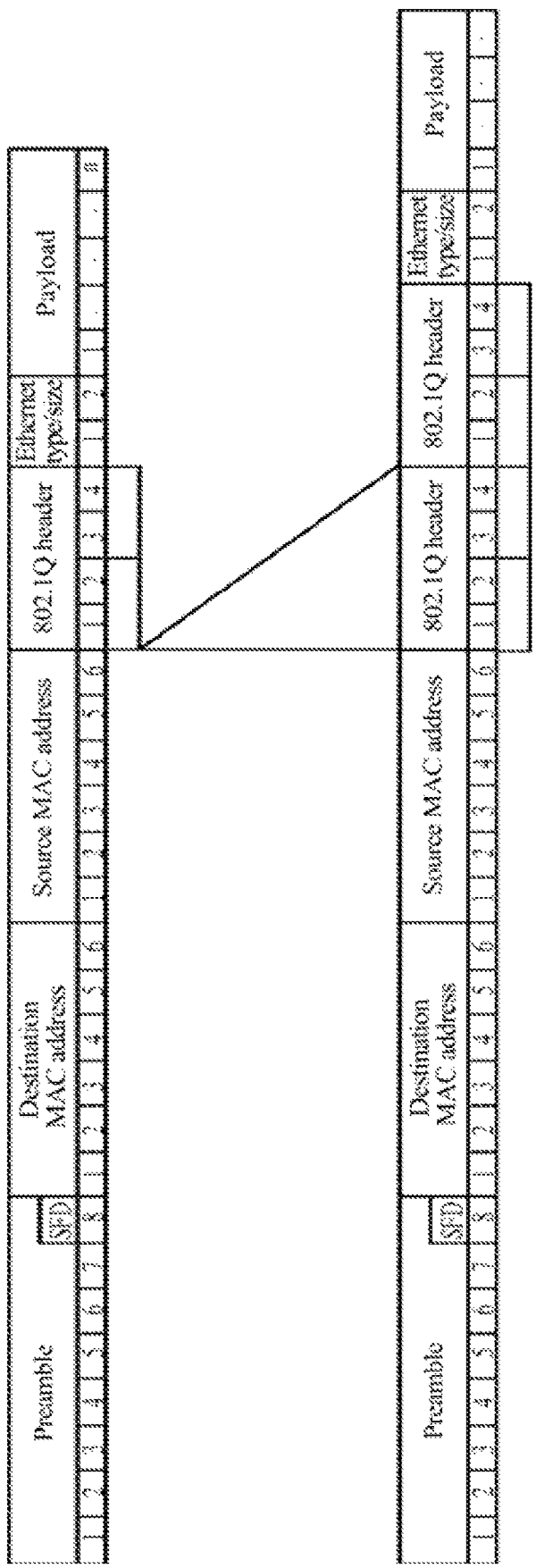
FIG. 12A shows an Ethernet II frame format provided by an implementation of the present disclosure.
Figure 12B:
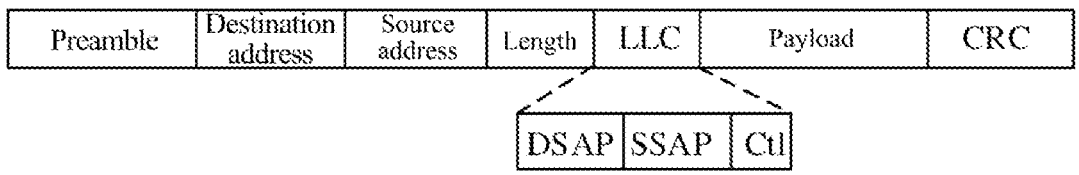
FIG. 12B shows an 802.1q frame format provided by an implementation of the present disclosure.
Figure 12C:
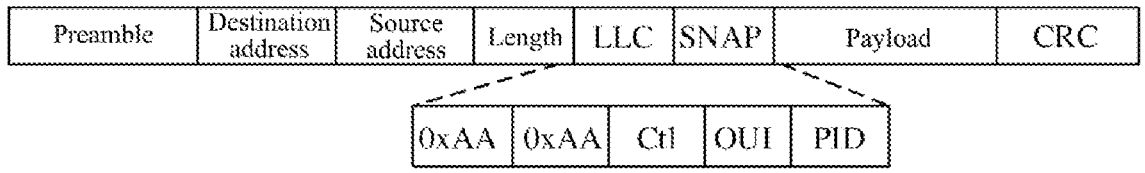
FIG. 12C shows an 802.2/802.3 LLC/SNAP frame format provided by an implementation of the present disclosure.

Here, the frame format may be, for example, an Ethernet II frame format shown in FIG. 12A, or an 802.1q frame format shown in FIG. 12B, or an 802.2/802.3 LLC/SNAP frame format shown in FIG. 12C.

Here, the LLC field includes the following information: a Destination Service Access Point (DSAP), a Source Service Access Point (SSAP), and control information (Ctl).

Here, the SNAP field includes the following information: an Organizationally Unique Identifier (OUI) and a Protocol ID (PID).

Optionally, an implementation of the present disclosure further includes the following act:

the first device receives first feedback information sent by the second device after sending the Ethernet frame on which the Ethernet header compression is not performed to the second device, wherein the first feedback information is used for indicating whether the second device correctly receives the Ethernet frame on which the Ethernet header compression is not performed and which is sent by the first device. Here, the first feedback information includes at least one of the following:

first context identifier information for representing a context to which the Ethernet header information is applied;

third indication information for indicating whether information sent by the second device is feedback information or data;

second CRC information for the first device to check the received first feedback information;

fourth indication information for indicating at least one of the following: the first feedback information being feedback for Ethernet header information, the first feedback information being feedback for target protocol header information, and the first feedback information being feedback for the Ethernet header information and the target protocol header information, wherein the target protocol header includes at least one of the following: an IP header, a User Datagram Protocol (UDP) header, and a Real-time Transport Protocol (RTP) header.

In the above solution, the first context identifier information is represented by at least one of a session identifier, a data flow identifier, and a bearer identifier. Herein, the session identifier is, for example, a PDU session ID; the data flow identifier is, for example, a QFI; and the bearer identifier is, for example, a bearer ID.

In the above solution, the third indication information may be represented by Packet format type info, and the third indication information is used for indicating whether the information sent by the second device is feedback information or data. For example, the third indication information indicates that the information sent by the second device is feedback information. For another example, the third indication information indicates that the information sent by the second device is data. For another example, the third indication information indicates that the information sent by the second device is data plus feedback information.

In the above solution, the fourth indication information is used for indicating whether the first feedback information is feedback for the Ethernet header information or feedback for the target protocol header information. Or, the fourth indication information is used for indicating whether the first feedback information is feedback for the Ethernet header information, or feedback for the target protocol header information, or feedback for the Ethernet header information and the target protocol header information.

In act 1102, the first device sends an Ethernet frame on which the Ethernet header compression is performed to the second device, wherein the Ethernet frame on which the Ethernet header compression is performed includes compressed Ethernet header information.

In an implementation of the present disclosure, the compressed Ethernet header information includes at least one of the following:

first context identifier information for representing a context to which the Ethernet header information is applied;

first indication information for indicating whether the Ethernet header information in the Ethernet frame is full or compressed;

first CRC information for the second device to check the received Ethernet header information;

second indication information for the second device to determine a header format of the Ethernet header information, and then determine a decompression mode based on the header format of the Ethernet header information.

In the above solution, the first context identifier information is represented by at least one of a session identifier, a data flow identifier, and a bearer identifier. Herein, the session identifier is, for example, a PDU session ID; the data flow identifier is, for example, a QFI; and the bearer identifier is, for example, a bearer ID.

Here, for the data header of the Ethernet frame, that is, the target protocol header, context identifier information (called second context identifier information) is also needed to represent a context to which target protocol header information is applied. To distinguish the first context identifier information from the second context identifier information, the first context identifier information and the second context identifier information belong to different identifier ranges.

In the above solution, the first indication information may be represented through packet format type info, and the first indication information is used for indicating whether the Ethernet header information in the Ethernet frame is full or compressed. Here, the first indication information indicates the Ethernet header information in the Ethernet frame is compressed Ethernet header information.

In the above solution, the second indication information is used for the second device to determine a header format of the Ethernet header information, and then determine a decompression mode based on the header format of the Ethernet header information. In an example, the second indication information may be a profile identifier. Further, the second indication information is used for the second device to determine at least one of the following of the Ethernet header information:

a frame format;

whether an Ethernet type field is used for identifying a length or a type;

whether an 802.1q field exists;

Whether an 802.1q field exists, and if the 802.1q field exists, whether there is one 802.1q field or two 802.1q fields;

whether an LLC field exists;

whether an SNAP field exists.

Optionally, an implementation of the present disclosure further includes the following act:

the first device receives second feedback information sent by the second device after sending the Ethernet frame on which the Ethernet header compression is performed to the second device, wherein the second feedback information is used for indicating whether the second device correctly receives the Ethernet frame on which the Ethernet header compression is performed and which is sent by the first device.

Here, the second feedback information includes at least one of the following:

first context identifier information for representing a context to which the Ethernet header information is applied;

third indication information for indicating whether information sent by the second device is feedback information or data;

second CRC information for the first device to check the received second feedback information;

fourth indication information for indicating at least one of the following: the first feedback information being feedback for Ethernet header information, the first feedback information being feedback for target protocol header information, and the first feedback information being feedback for the Ethernet header information and the target protocol header information, wherein the target protocol header includes at least one of the following: an IP header, a User Datagram Protocol (UDP) header, and a Real-time Transport Protocol (RTP) header.

In the above solution, the first context identifier information is represented by at least one of a session identifier, a data flow identifier, and a bearer identifier. Herein, the session identifier is, for example, a PDU session ID; the data flow identifier is, for example, a QFI; and the bearer identifier is, for example, a bearer ID.

In the above solution, the third indication information may be represented by Packet format type info, and the third indication information is used for indicating whether the information sent by the second device is feedback information or data. For example, the third indication information indicates that the information sent by the second device is feedback information. For another example, the third indication information indicates that the information sent by the second device is data. For another example, the third indication information indicates that the information sent by the second device is data plus feedback information.

In the above solution, the fourth indication information is used for indicating whether the first feedback information is feedback for the Ethernet header information or feedback for the target protocol header information. Or, the fourth indication information is used for indicating whether the first feedback information is feedback for the Ethernet header information, or feedback for the target protocol header information, or feedback for the Ethernet header information and the target protocol header information.

In an implementation of the present disclosure, the Ethernet header information and the target protocol header information correspond to different header formats. Or, the Ethernet header information and the target protocol header information correspond to a same header format and different context identifier information; or, the Ethernet header information and the target protocol header information correspond to different header formats and different context identifier information.

For example, the Ethernet header information and the target protocol header information correspond to different PDCP packet header formats to distinguish different PDCP control PDUs; or, the Ethernet header information and the target protocol header information correspond to a same PDCP packet header format and different identifiers (such as CIDs).

In an implementation of the present disclosure, for the control plane procedure, the terminal may report first information to a network, and the first information includes at least one of the following:
1) Compression Capability information indicating whether the terminal supports the header compression function;
2) A header compression mode of an Ethernet frame (an Ethernet PDU).
3) A type of a packet on which header compression needs to be performed, such as an IP packet, an Ethernet frame (i.e., an Ethernet PDU), and an unstructured packet. In case of the unstructured packet, different unstructured packets may be distinguished by specific values. For example, OTT-1 takes a value 001 corresponding to unstructured packet type 1, and OTT-2 takes a value 002 corresponding to unstructured packet type 2.

In a specific implementation, the terminal may report the first information to the network through a registration procedure, a PDU session establishment procedure, a PDU session modification process, or a Service Request procedure, etc. Further, the network side may send indication information to the terminal according to the first information which includes at least one of the following:

1) the terminal decides whether to perform the Ethernet header compression;
2) a header compression mode of an Ethernet frame (an Ethernet PDU).

The above first information and indication information may be transmitted between a core network and the terminal through a Non-Access Stratum (NAS) message, or delivered between a base station on an access network side and a core network through an N2 interface, or delivered between the terminal and the base station on the access network side through an air interface Radio Resource Control (RRC) signaling.

Figure 13:
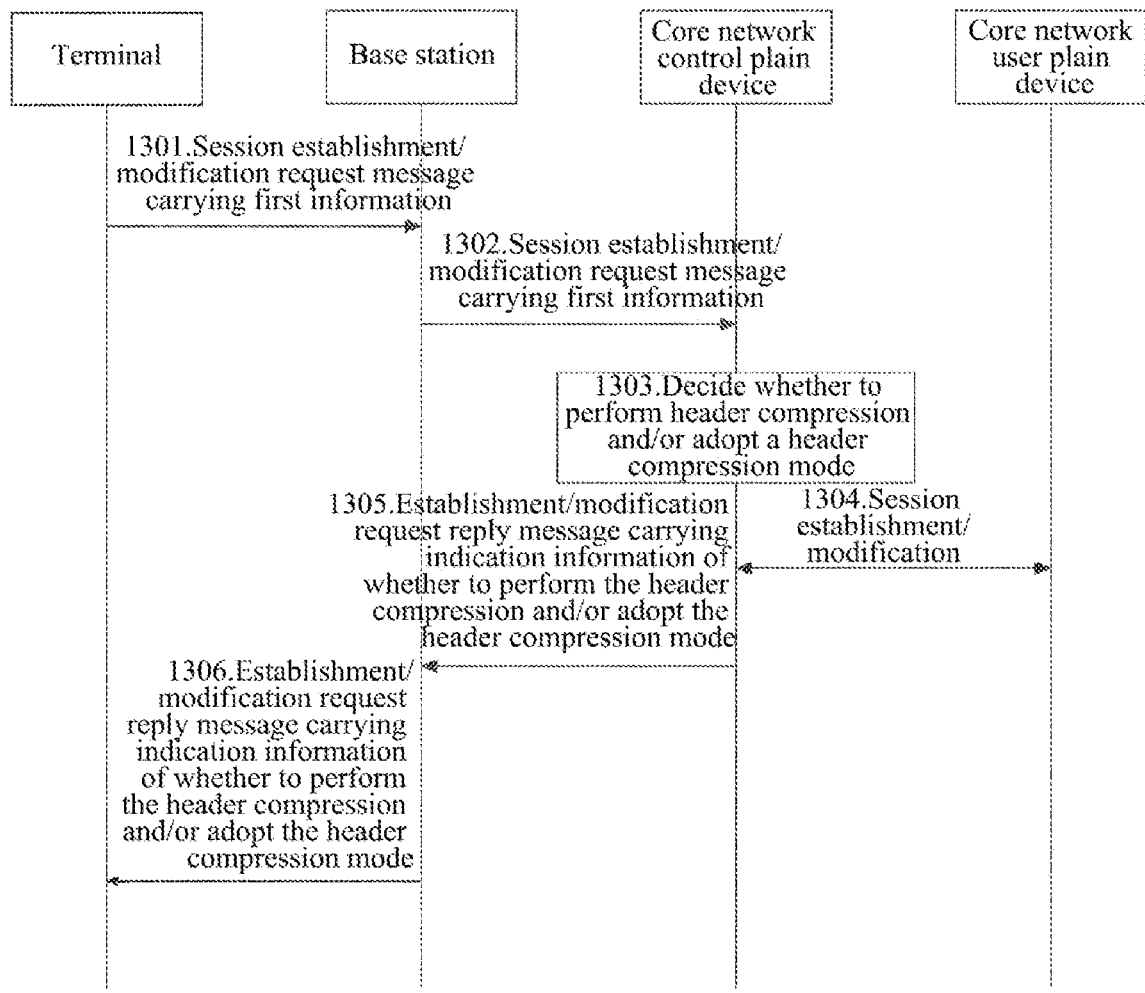
FIG. 13 is a schematic diagram of a session establishment/modification procedure provided by an implementation of the present disclosure.

FIG. 13 is a schematic diagram of a session establishment/modification procedure provided by an implementation of the present disclosure. As shown in FIG. 13, the procedure includes the following acts 1301-1306.

In act 1301, a terminal sends a session establishment/modification request message to a base station, wherein the session establishment/modification request message carries first information.

In act 1302, the base station sends a session establishment/modification request message to a core network control plane device, wherein the session establishment/modification request message carries first information.

In act 1303, the core network control plane device decides whether to perform header compression and/or adopt a header compression mode.

In act 1304, the core network control plane device and a core network user plane device perform session establishment/modification.

In act 1305, the core network control plane device sends an establishment/modification request reply message to the base station, wherein the establishment/modification request reply message carries indication information of whether to perform the header compression and/or adopt the header compression mode.

In act 1306, the base station sends an establishment/modification request reply message to the terminal, wherein the establishment/modification request reply message carries indication information of whether to perform the header compression and/or adopt the header compression mode.

Figure 14:
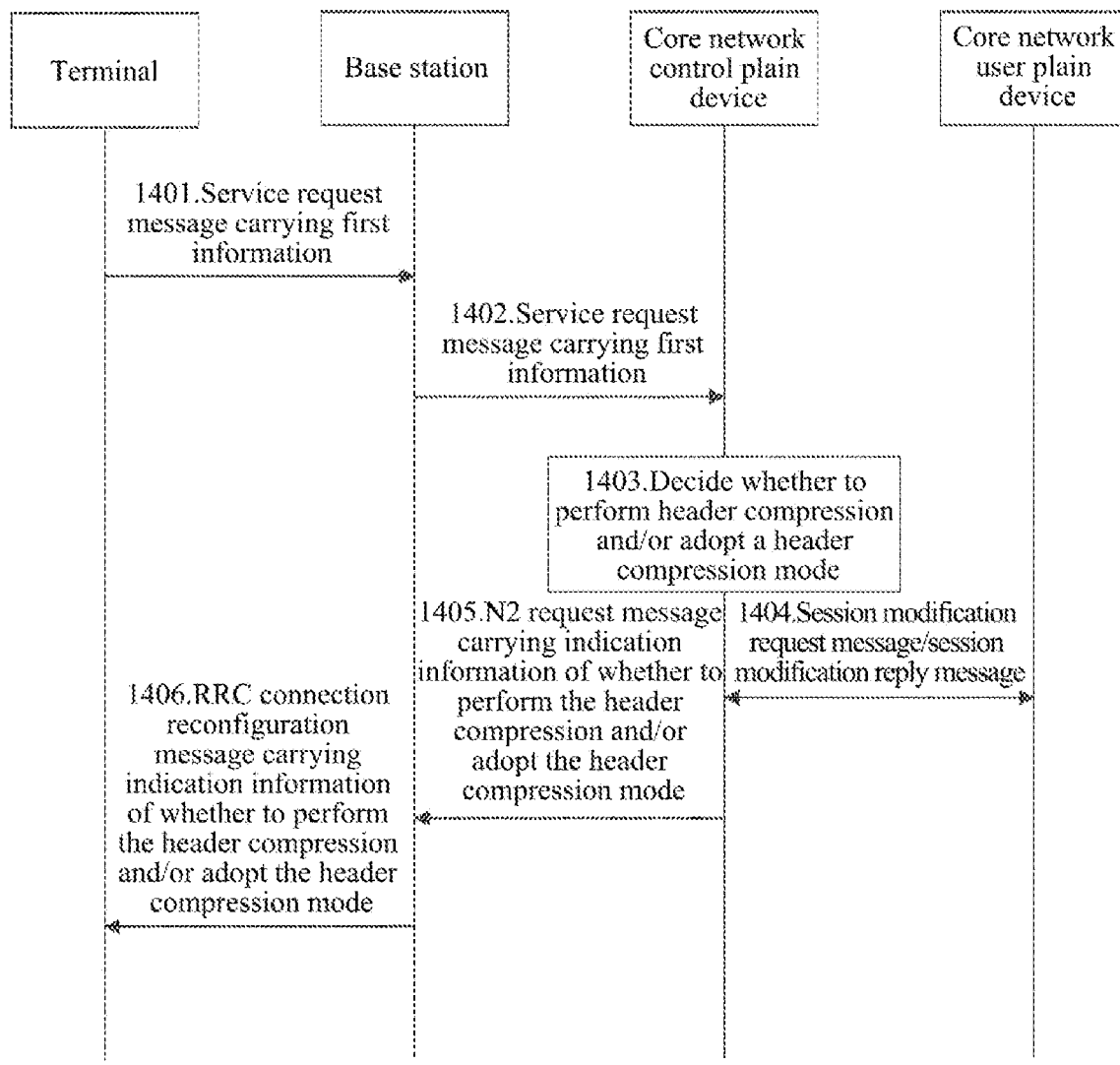
FIG. 14 is a schematic diagram of a service request procedure provided by an implementation of the present disclosure.

FIG. 14 is a schematic diagram of a service request procedure provided by an implementation of the present disclosure. As shown in FIG. 14, the process includes the following acts 1401-1406.

In act 1401, a terminal sends a session service request message to a base station, wherein the service request message carries first information.

In act 1402, the base station sends a service request message to a core network control plane device, wherein the service request message carries first information.

In act 1403, the core network control plane device decides whether to perform header compression and/or adopt a header compression mode.

In act 1404, the core network control plane device sends a session modification request message to a core network user plane device, and receives a session modification reply message sent by the core network user plane device.

In act 1405, the core network control plane device sends an N2 request message to the base station, wherein the N2 request message carries indication information of whether to perform the header compression and/or adopt the header compression mode.

In act 1406, the base station sends an RRC connection reconfiguration message to the terminal, wherein the RRC connection reconfiguration message carries indication information of whether to perform the header compression and/or adopt the header compression mode.

Figure 15:
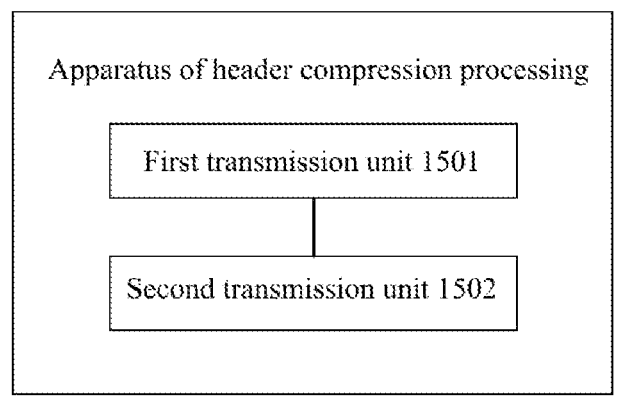
FIG. 15 is a first schematic diagram of a structure of an apparatus of header compression processing provided by an implementation of the present disclosure.

FIG. 15 is a first schematic diagram of a structure of an apparatus of header compression processing provided by an implementation of the present disclosure. As shown in FIG. 15, the apparatus includes a first transmission unit 1501 and a second transmission unit 1502.

The first transmission unit 1501 is configured to a first configuration signaling between a first network element and a second network element, wherein the first configuration signaling is used for performing control of a header compression function on the first network element or the second network element.

The second transmission unit 1502 is configured to transmit a second configuration signaling between the first network element and a terminal, wherein the second configuration signaling is used for performing the control of the header compression function on the terminal.

Herein the control of the header compression function includes one of the following: enable of the header compression function, configuration of the header compression function, and disable of the header compression function.

In an implementation, the first transmission unit 1501 is configured to send the first configuration signaling to the second network element, wherein the first configuration signaling is used for performing the control of the header compression function on the first network element or the second network element.

In an implementation, the first transmission unit 1501 is configured to receive the first configuration signaling sent by the second network element, wherein the first configuration signaling is used for performing the control of the header compression function on the first network element or the second network element.

In an implementation, the second transmission unit 1502 is configured to send the second configuration signaling to the terminal, wherein the second configuration signaling is used for performing the control of the header compression function on the terminal.

In an implementation, the header compression function is used for header compression of an Ethernet frame; and the Ethernet frame includes an Ethernet header and a payload;
  the header compression refers to compressing the Ethernet header.

In an implementation, the header compression function is used for header compression of an Ethernet frame; and the Ethernet frame includes an Ethernet header, a target protocol header and a payload;
  the header compression refers to compressing the Ethernet header, or compressing the target protocol header, or compressing the Ethernet header and the target protocol header.

In an implementation, the target protocol header includes at least one of an IP header, a UDP header, and an RTP header.

In an implementation, the apparatus of the header compression processing is applied to a first network element, the first network element is an Access and Mobility Management Function (AMF) network element and/or a Session Management Function (SMF) network element, and the second network element is a User Plain Function (UPF) network element.

In an implementation, the first configuration signaling is used for performing the control of the header compression function on the UPF, and the second configuration signaling is used for performing the control of the header compression function on the terminal.

In an implementation, the configuration of the header compression function takes a session or a data flow as a granularity.

In an implementation, the header compression function is implemented on a target protocol layer, and the target protocol layer is located above a Packet Data Convergence Protocol (PDCP) layer.

In an implementation, the first network element is a base station, and the second network element is an AMF and/or SMF; or, the first network element is an AMF and/or SMF, and the second network element is a base station.

In an implementation, the first configuration signaling is used for performing the control of the header compression function on the base station, and the second configuration signaling is used for performing the control of the header compression function on the terminal.

In an implementation, the configuration of the header compression function takes a bearer as a granularity.

In an implementation, the header compression function is implemented on a PDCP layer.

Those skilled in the art should understand that the relevant description of the apparatus of header compression processing in the implementation of the present disclosure may be understood with reference to the relevant description of the method of header compression processing in the implementation of the present disclosure.

Figure 16:
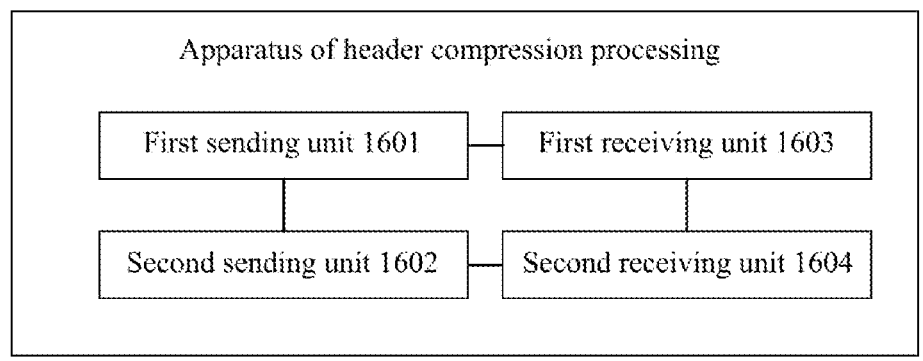
FIG. 16 is a second schematic diagram of a structure of an apparatus of header compression processing provided by an implementation of the present disclosure.

FIG. 16 is a second schematic diagram of a structure of an apparatus of header compression processing provided by an implementation of the present disclosure. As shown in FIG. 16, the apparatus includes a first sending unit 1601 and a second sending unit 1602.

The first sending unit 1601 is configured to send an Ethernet frame on which Ethernet header compression is not performed to a second device, wherein the Ethernet frame on which the Ethernet header compression is not performed includes full Ethernet header information.

The second sending unit 1602 is configured to send an Ethernet frame on which the Ethernet header compression is performed to the second device, wherein the Ethernet frame on which the Ethernet header compression is performed includes compressed Ethernet header information.

In an implementation, the full Ethernet header information includes at least one of the following:
  first context identifier information for representing a context to which the Ethernet header information is applied;
  first indication information for indicating whether the Ethernet header information in the Ethernet frame is full or compressed;
  first Cyclic Redundancy Check (CRC) information for the second device to check the received Ethernet header information; and
  second indication information for the second device to determine a header format of the Ethernet header information, and then determine a decompression mode based on the header format of the Ethernet header information.

In an implementation, the compressed Ethernet header information includes at least one of the following:
  first context identifier information for representing a context to which the Ethernet header information is applied;
  first indication information for indicating whether the Ethernet header information in the Ethernet frame is full or compressed;

first Cyclic Redundancy Check (CRC) information for the second device to check the received Ethernet header information; and second indication information for the second device to determine a header format of the Ethernet header information, and then determine a decompression mode based on the header format of the Ethernet header information.

In an implementation, the first context identifier information is represented by at least one of a session identifier, a data flow identifier, and a bearer identifier.

In an implementation, the first context identifier information and the second context identifier information belong to different identifier ranges, wherein the second context identifier information is used for representing a context to which target protocol header information is applied, and the target protocol header includes at least one of the following: an IP header, a User Datagram Protocol (UDP) header, and a Real-time Transport Protocol (RTP) header.

In an implementation, the second indication information is used for the second device to determine at least one of the following of the Ethernet header information:

a frame format;

whether an Ethernet type field is used for identifying a length or a type;

whether an 802.1q field exists;

Whether an 802.1q field exists, and if the 802.1q field exists, whether there is one 802.1q field or two 802.1q fields;

whether an LLC field exists; and whether an SNAP field exists.

In an implementation, the apparatus further includes a first receiving unit 1603.

The first receiving unit 1603 is configured to receive first feedback information sent by the second device, wherein the first feedback information is used for indicating whether the second device correctly receives the Ethernet frame on which the Ethernet header compression is not performed and which is sent by the first device.

In an implementation, the apparatus further includes a second receiving unit 1604.

The second receiving unit 1604 is configured to receive second feedback information sent by the second device, wherein the second feedback information is used for indicating whether the second device correctly receives the Ethernet frame on which the Ethernet header compression is performed and which is sent by the first device.

In an implementation, the first feedback information includes at least one of the following:

first context identifier information for representing a context to which the Ethernet header information is applied;

third indication information for indicating whether information sent by the second device is feedback information or data;

second CRC information for the first device to check the received first feedback information; and fourth indication information for indicating at least one of the following: the first feedback information being feedback for Ethernet header information, the first feedback information being feedback for target protocol header information, and the first feedback information being feedback for the Ethernet header information and the target protocol header information, wherein the target protocol header includes at least one of the following: an IP header, a User Datagram Protocol (UDP) header, and a Real-time Transport Protocol (RTP) header.

In an implementation, the second feedback information includes at least one of the following:

first context identifier information for representing a context to which the Ethernet header information is applied;

third indication information for indicating whether information sent by the second device is feedback information or data;

second Cyclic Redundancy Check (CRC) information for the first device to check the received second feedback information; and fourth indication information for indicating at least one of the following: the first feedback information being feedback for Ethernet header information, the first feedback information being feedback for target protocol header information, and the first feedback information being feedback for the Ethernet header information and the target protocol header information, wherein the target protocol header includes at least one of the following: an IP header, a User Datagram Protocol (UDP) header, and a Real-time Transport Protocol (RTP) header.

In an implementation, the Ethernet header information and the target protocol header information correspond to different header formats; or, the Ethernet header information and the target protocol header information correspond to a same header format and different context identifier information; or, the Ethernet header information and the target protocol header information correspond to different same header formats and different context identifier information.

In an implementation, the first device is a terminal and the second device is a UPF.

In an implementation, the first device is a UPF, and the second device is a terminal.

In an implementation, the first device is a terminal and the second device is a base station.

In an implementation, the first device is a base station, and the second device is a terminal.

Those skilled in the art should understand that the relevant description of the apparatus of header compression processing in the implementation of the present disclosure may be understood with reference to the relevant description of the method of header compression processing in the implementation of the present disclosure.

Figure 17:
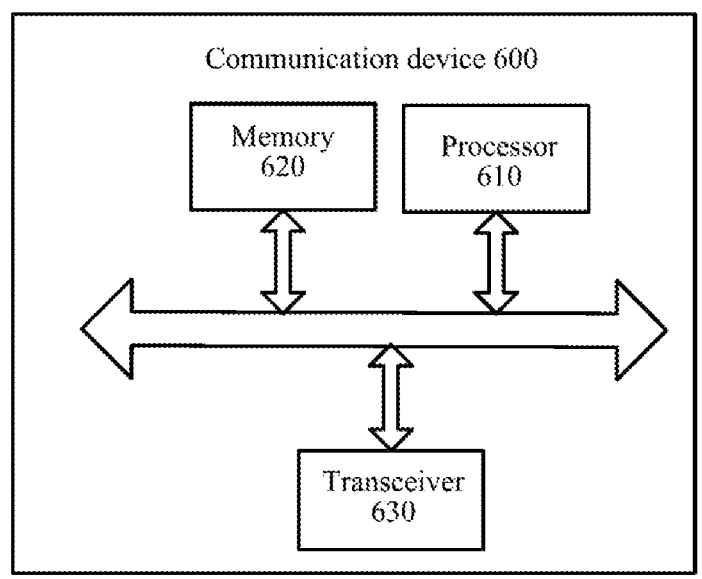
FIG. 17 is a schematic diagram of a structure of a communication device provided by an implementation of the present disclosure.

FIG. 17 is a schematic diagram of a structure of a communication device 600 provided by an implementation of the present disclosure. The communication device may be a terminal or a network device, such as a base station, a UPF. The communication device 600 shown in FIG. 17 includes a processor 610, which may call and run a computer program from a memory to implement the methods in the implementations of the present disclosure.

Optionally, as shown in FIG. 17, the communication device 600 may further include a memory 620. Herein, the processor 610 may call and run a computer program from the memory 620 to implement the method in the implementation of the present disclosure.

Herein, the memory 620 may be a separate device independent of the processor 610 or may be integrated in the processor 610.

Optionally, as shown in FIG. 17, the communication device 600 may further include a transceiver 630, and the processor 610 may control the transceiver 630 to communicate with another device. Specifically, information or data may be sent to another device or information or data sent by another device may be received.

Herein, the transceiver 630 may include a transmitter and a receiver. The transceiver 630 may also further include antennas, wherein a quantity of antennas may be of one or more.

Optionally, the communication device 600 may be a network device of the implementation of the present disclosure, and the communication device 600 may implement the corresponding processes implemented by the network device in various methods of the implementation of the present disclosure, which will not be repeated here again for brevity.

Optionally, the communication device 600 may be specifically a mobile terminal/terminal of the implementations of the present disclosure, and the communication device 600 may implement corresponding processes implemented by the mobile terminal/terminal in various methods of the implementations of the present disclosure, which will not be repeated here for brevity.

Figure 18:
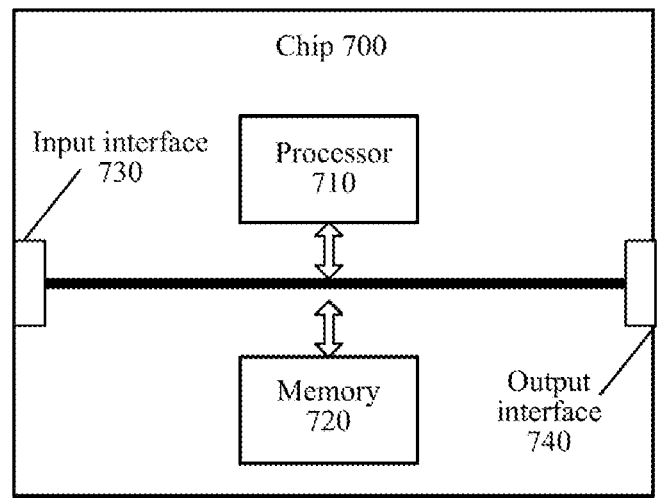
FIG. 18 is a schematic diagram of a structure of a chip of an implementation of the present disclosure.

FIG. 18 is a schematic diagram of structure of a chip of an implementation of the present disclosure. A chip 700 shown in FIG. 18 includes a processor 710. The processor 710 may call and run a computer program from a memory to implement the method in the implementation of the present disclosure.

Optionally, as shown in FIG. 18, the chip 700 may further include a memory 720. Herein, the processor 710 may call and run a computer program from the memory 720 to implement the method in the implementation of the present disclosure.

Herein, the memory 720 may be a separate device independent of the processor 710 or may be integrated in the processor 710.

Optionally, the chip 700 may further include an input interface 730. Herein, the processor 710 may control the input interface 730 to communicate with another device or chip. Specifically, information or data sent by another device or chip may be acquired.

Optionally, the chip 700 may further include an output interface 740. Herein, the processor 710 may control the output interface 740 to communicate with another device or chip. Specifically, information or data may be outputted to another device or chip.

Optionally, the chip may be applied in a network device of the implementation of the present disclosure, and the chip may implement the corresponding processes implemented by the network device in various methods of the implementation of the present disclosure, which will not be repeated here again for brevity.

Optionally, the chip may be applied in a mobile terminal/terminal of the implementation of the present disclosure, and the chip may implement corresponding processes implemented by the mobile terminal/terminal in various methods of the implementations of the present disclosure, which will not be repeated here for brevity.

It should be understood that the chip mentioned in the implementation of the present disclosure may also be referred to as a system-level chip, a system chip, a chip system or a system chip-on-chip, etc.

Figure 19:
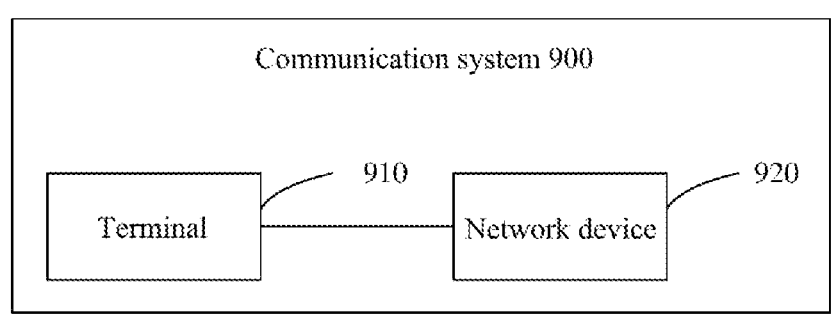
FIG. 19 is a schematic block diagram of a communication system provided by an implementation of the present disclosure.

FIG. 19 is a schematic block diagram of a communication system 900 according to an implementation of the present disclosure. As shown in FIG. 19, the communication system 900 includes a terminal 910 and a network device 920.

Herein, the terminal 910 may be configured to implement the corresponding functions implemented by the terminal in the above-mentioned method, and the network device 920 may be configured to implement the corresponding functions implemented by the network device in the above-mentioned method, which will not be repeated here for brevity.

It should be understood that, the processor in the implementation of the present disclosure may be an integrated circuit chip having a signal processing capability. In an implementation process, the acts of the foregoing method implementations may be accomplished by an integrated logic circuit of hardware in the processor or instructions in a form of software. The above processor may be a general purpose processor, a Digital Signal Processor (DSP), an Application Specific Integrated Circuit (ASIC), a Field Programmable Gate Array (FPGA) or another programmable logic device, a discrete gate or a transistor logic device, or a discrete hardware component. The methods, acts and logical block diagrams disclosed in the implementation of the present disclosure may be implemented or performed. The general purpose processor may be a microprocessor, or the processor may also be any conventional processor or the like. The acts of the method disclosed with reference to the implementation of the present disclosure may be directly embodied as being executed and accomplished by a hardware decoding processor, or being executed and accomplished by a combination of hardware and software modules in a decoding processor. The software modules may be located in a storage medium commonly used in the art, such as a random access memory, a flash memory, a read-only memory, a programmable read-only memory or an electrically erasable programmable memory, or a register, etc. The storage medium is located in a memory, and the processor reads information in the memory and accomplishes the acts of the above method in combination with hardware thereof.

It may be understood that, the memory in the implementation of the present disclosure may be a volatile memory or a non-volatile memory, or may include both of a volatile memory and a non-volatile memory. Herein, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. Through exemplary but not limitative description, many forms of RAMs are available, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that memories in the systems and methods described in this specification are intended to include, but are not limited to, these memories and any memory of another proper type.

It should be understood that, the foregoing memory is exemplary but not limitative description. For example, the memory in the implementations of the present disclosure may also be a Static RAM (SRAM), a Dynamic RAM (DRAM), a Synchronous DRAM (SDRAM), a double data rate SDRAM (DDR SDRAM), an enhanced SDRAM (ESDRAM), or a synchlink DRAM (SLDRAM), a Direct Rambus RAM (DR RAM), or the like. That is, memories in the implementations of the present disclosure are intended to include, but are not limited to, these memories and any memory of another proper type.

An implementation of the present disclosure further provides a computer readable storage medium, configured to store a computer program.

Optionally, the computer readable storage medium may be applied in a network device of the implementation of the present disclosure, and the computer program causes a computer to perform the corresponding processes implemented by the network device in various methods of the implementations of the present disclosure, which will not be repeated here again for brevity.

Optionally, the computer readable storage medium may be applied in a mobile terminal/terminal of the implementations of the present disclosure, and the computer program causes a computer to perform corresponding processes implemented by the mobile terminal/terminal in various methods of the implementations of the present disclosure, which will not be repeated here for brevity.

An implementation of the present disclosure also provides a computer program product, including computer program instructions.

Optionally, the computer program product may be applied in a network device of the implementation of the present disclosure, and the computer program instructions cause a computer to perform the corresponding processes implemented by the network device in various methods of the implementation of the present disclosure, which will not be repeated here again for brevity.

Optionally, the computer program product may be applied in a mobile terminal/terminal of the implementations of the present disclosure, and the computer program instructions cause a computer to perform corresponding processes implemented by the mobile terminal/terminal in various methods of the implementations of the present disclosure, which will not be repeated here for brevity.

An implementation of the present disclosure also provides a computer program.

Optionally, the computer program may be applied in a network device of the implementation of the present disclosure. When the computer program is run on a computer, the computer is caused to perform the corresponding processes implemented by the network device in various methods of the implementations of the present disclosure, which will not be repeated here again for brevity.

Optionally, the computer program may be applied in a mobile terminal/terminal of the implementations of the present disclosure. When the computer program is run on a computer, the computer is caused to perform corresponding processes implemented by the mobile terminal/terminal in various methods of the implementations of the present disclosure, which will not be repeated here for brevity.

Those of ordinary skill in the art will recognize that the exemplary units and algorithm acts described in combination with the implementations disclosed herein can be implemented in electronic hardware, or a combination of computer software and electronic hardware. Whether these functions being executed in a hardware or software mode depend on a specific application and design constraint condition of the technical solution. Skilled artisans may use different methods to implement the described functions in respect to each particular application, but such implementation should not be considered to be beyond the scope of the present disclosure.

Those skilled in the art may clearly learn that for convenience and conciseness of description, specific working processes of the systems, the apparatuses and the units described above may refer to the corresponding processes in the aforementioned method implementations, which will not be repeated here again for brevity.

In several implementations provided by the present disclosure, it should be understood that the disclosed systems, apparatuses and methods may be implemented in another manner. For example, the apparatus implementations described above are only illustrative, for example, the division of the units is only a logical function division, and there may be another division manner in an actual implementation, for example, multiple units or components may be combined or integrated into another system, or some features may be ignored or not executed. At another point, the mutual coupling or the direct coupling or the communication connection shown or discussed may be indirect coupling or a communication connection through some interfaces, apparatuses or units, and may be in electrical, mechanical or another form.

The unit described as a separate component may or may not be physically separated, and the component shown as a unit may or may not be a physical unit, i.e., it may be located in one place or may be distributed over multiple network units. Part or all of the units therein may be selected according to an actual need to achieve the purpose of the solution of the present implementation.

In addition, various functional units in various implementations of the present disclosure may be integrated in one processing unit, or the various units may be physically present separately, or two or more units may be integrated in one unit.

The functions may be stored in a computer readable storage medium, if realized in a form of software functional units and sold or used as a separate product. Based on this understanding, the technical solution of the present disclosure, in essence, or the part contributing to the prior art, or the part of the technical solution, may be embodied in the form of a software product, wherein the computer software product is stored in a storage medium and includes a number of instructions for causing a computer device (which may be a personal computer, a server, or a network device, or the like) to perform all or part of the acts of the method described in various implementations of the present disclosure. And the foregoing storage medium includes: various kinds of media that may store program codes, such as a USB flash drive, a removable hard disk, a Read-Only Memory (ROM), a Random Access Memory (RAM), a magnetic disk, or an optical disc, etc.

What are described above are merely specific implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be subjected to the protection scope of the claims.

What we claim is:

1. A method of header compression processing, comprising:

sending, by a first device, an Ethernet frame on which Ethernet header compression is not performed to a second device, wherein the Ethernet frame on which the Ethernet header compression is not performed comprises full Ethernet header information;

sending, by the first device, an Ethernet frame on which the Ethernet header compression is performed to the second device, wherein the Ethernet frame on which the Ethernet header compression is performed comprises compressed Ethernet header information;

wherein the full Ethernet header information comprises the following: context identifier information for identifying a context to which the full Ethernet header information is applicable; a first indication information for indicating that the Ethernet header information in the Ethernet frame is full; and wherein the compressed Ethernet header information comprises the following: context identifier information for identifying a context to which the compressed Ethernet header information is applicable; a second indication information for indicating that the Ethernet header information in the Ethernet frame is compressed;

further comprising:

receiving, by the first device, first feedback information sent by the second device after sending an Ethernet frame on which the Ethernet header compression is not performed to the second device, wherein the first feedback information is used for indicating whether the second device correctly receives the Ethernet frame on which the Ethernet header compression is not performed and which is sent by the first device;

wherein the first feedback information comprises:

first context identifier information for representing a context to which the Ethernet header information is applied.

2. The method according to claim 1, wherein the first device is at least one of a terminal, a base station or a User Plane Function (UPF);

and the second device is at least one of the UPF, the base station or the terminal.

3. An apparatus of head compression processing, comprising: a processor, a memory and a transceiver, wherein the memory is configured to store a computer program, the transceiver is configured to communicate with another device under control of the processor, and the processor is configured to call and run the computer program stored in the memory to control the apparatus to:

send, through the transceiver, an Ethernet frame on which Ethernet header compression is not performed to a second device, wherein the Ethernet frame on which the Ethernet header compression is not performed comprises full Ethernet header information; and send, through the transceiver, an Ethernet frame on which the Ethernet header compression is performed to the second device, wherein the Ethernet frame on which the Ethernet header compression is performed comprises compressed Ethernet header information;

wherein the full Ethernet header information comprises the following: context identifier information for identifying a context to which the full Ethernet header information is applicable; a first indication information for indicating that the Ethernet header information in the Ethernet frame is full; and wherein the compressed Ethernet header information comprises the following: context identifier information for identifying a context to which the compressed Ethernet header information is applicable; a second indication information for indicating that the Ethernet header information in the Ethernet frame is compressed;

wherein the processor is configured to:

receive, through the transceiver, first feedback information sent by the second device, wherein the first feedback information is used for indicating whether the second device correctly receives the Ethernet frame on which the Ethernet header compression is not performed and which is sent by the apparatus;

wherein the first feedback information comprises:

first context identifier information for representing a context to which the Ethernet header information is applied.

4. The apparatus according to claim 3, wherein the apparatus is at least one of a terminal, a base station or a User Plane Function (UPF);

and the second device is at least one of the UPF, the base station or the terminal.

* * * * *